Sept. 25, 1951 A. L. SCHADE 2,569,075
PREVENTION OF ENZYMATIC DISCOLORATION OF POTATOES
Filed March 21, 1946

INVENTOR.
Arthur L. Schade
BY
W. J. Eccleston,
ATTORNEY

Patented Sept. 25, 1951

2,569,075

UNITED STATES PATENT OFFICE 2,569,075

PREVENTION OF ENZYMATIC DISCOLORATION OF POTATOES

Arthur L. Schade, New York, N. Y., assignor to the United States of America as represented by the Secretary of War Application March 21, 1946, Serial No. 656,117

5 Claims. (Cl. 99—100)

This invention relates to the prevention of enzymatic discoloration of potatoes, and more particularly to an electronic treatment of potatoes by passing a high frequency alternating electric current through them in order to suppress enzymatic activity.

Peeled, dried, and dehydrated potatoes have a pronounced tendency to discolor, and the resulting product is unacceptable to the customer because of its unappetizing appearance. The cause of this phenomenon is the oxidizing action of enzymes, particularly of tyrosinase and peroxidase, on the potato after peeling. Numerous attempts have been made to overcome potato discoloration; the principally used process being treatment with a sodium bisulfite solution or simply heating in a saline solution. Both treatments impart an undesirable taste to the product.

It is therefore a major object of the present invention to effect a reduction of enzymatic activity of the potato sufficiently to prevent discoloration and other undesirable changes of enzymatic origin which occur in the course of dicing, blanching, drying, and other operations in the potato drying and potato dehydration process.

Another object of this invention is a potato treatment which prevents enzymatic discoloration and at the same time preserves the natural flavor and vitamin contents of the potato.

A further object is an electronic treatment for the prevention of enzymatic discoloration of potatoes as a preliminary step to drying or dehydration which permits accurate control of the process and optimum utilization of electric energy.

Another object of the invention is an electronic treatment for the prevention of enzymatic discoloration of potatoes, which combines speed of operation and uniform results in the treated product.

The foregoing and other objects which will become apparent from the following description are accomplished by permitting a high frequency alternating electric current to flow through potatoes surrounded by a liquid electrolyte medium.

The accompanying drawings, show, by way of example, a form of an apparatus for high frequency electronic treatment of potatoes.

Figure 1:
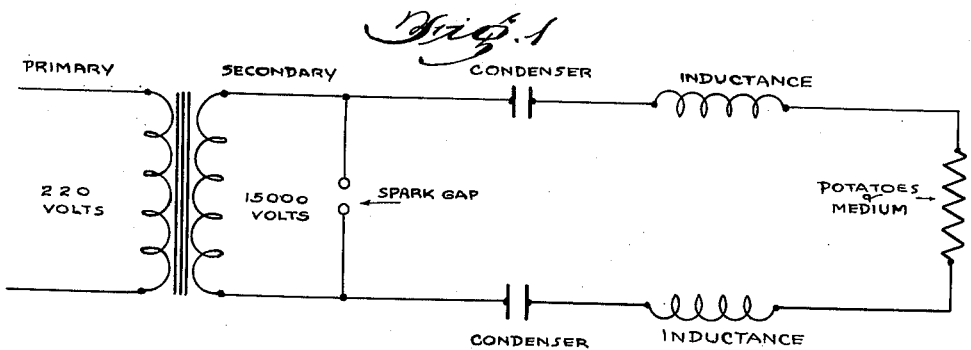

Fig. 1 of the drawings is a diagram of the high frequency alternating circuit in the treatment of the potatoes.

Figure 2:
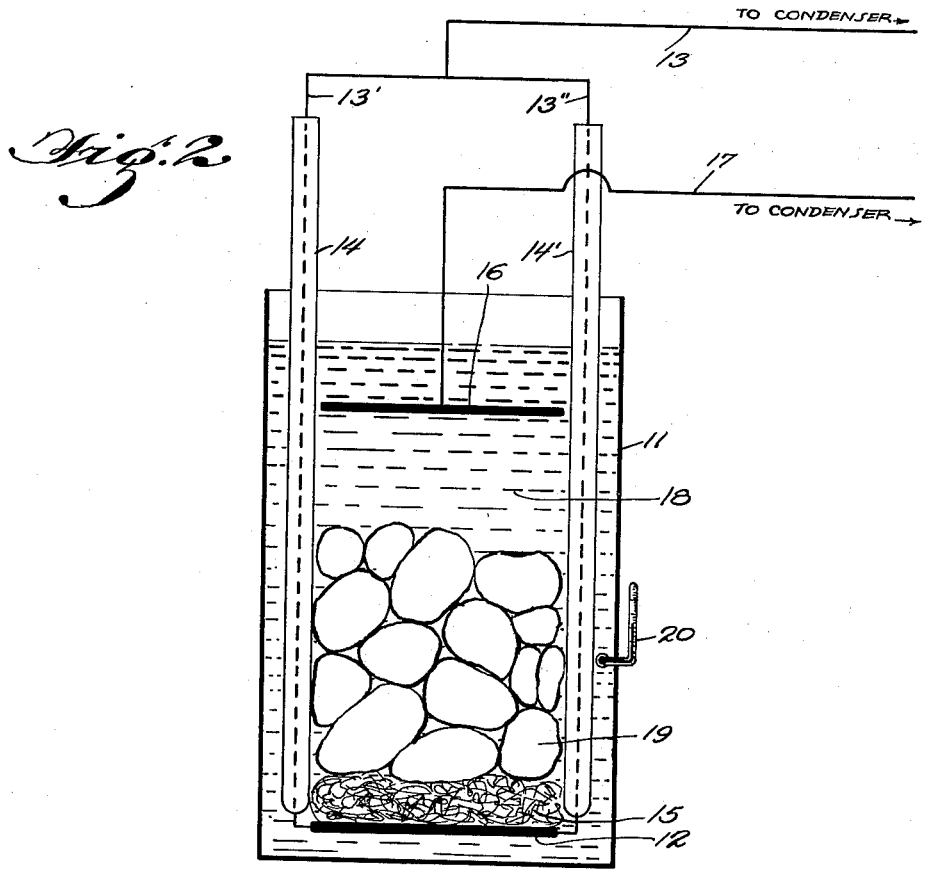

Fig. 2 is a diagrammatic section through a tank containing potatoes and the liquid electrolyte.

The circuit of the high frequency inductive apparatus used in the treatment of the potatoes is laid out as follows: A current in the order of 220 volts in the primary circuit is transformed into a current in the order of 15,000 volts in the secondary circuit. The secondary circuit is arranged as a spark gap oscillator; the secondary winding leads to a pair of condensers, a spark gap being provided between the wires leading to the condensers. The condensers are connected to a pair of electrodes in the tank containing the potatoes and a liquid medium. A pair of inductances is interposed between the condensers and the electrodes. When the current is turned on, the condensers are alternately charged and then discharged through the potatoes and the surrounding liquid medium. The liquid medium and potatoes in the tank will then form a resistance, in parallel with the oscillator.

In the diagram of the tank containing the potatoes and surrounding liquid medium, 11 denotes a tank of hard heat-resistant glass or of other suitable insulating material. A bottom electrode 12 is connected to one of the condensers by wires 13, 13', 13''; wires 13', 13'' are insulated by suitable insulators, e. g., glass tubing 14, 14'. Above bottom electrode 12 and parallel to the bottom of tank 11 is a layer 15 of glass wool or other suitable heat-resistant and non-conductive material, spaced from the bottom of tank 11 by supports (not shown). A top electrode 16, suitably supported by supporting means (not shown) is connected to the other condenser by wire 17. A liquid electrolyte 18 surrounds both electrodes 12 and 16. Potatoes 19 rest on layer 15 between electrodes 12 and 16, and are wholly surrounded by the liquid electrolyte 18. A thermometer 20 measures the temperature of the liquid electrolyte 18.

The following example illustrates the operation of the apparatus and the treatment of the potatoes: Peeled potatoes 19 are placed in tank 11, which is then filled with a liquid electrolyte 18, comprising for instance a .1% salt solution, to a level above top electrode 16. The current in the primary circuit (about 220 volts) is turned on, which causes a high frequency alternating current of about 15,000 volts and about 250,000 cycles to flow through liquid electrolyte and potatoes 19. The transfer of electrons involved in this current flow causes the temperature of the liquid electrolyte 18 and the potatoes 19 to rise quickly (the temperature of the liquid medium 18 increases from room temperature to 80° C. in about 3 minutes). When the temperature of the liquid electrolyte 18 has reached about 80° C., the current is turned off and the potatoes are removed. The treated potatoes are found to be substantially evenly cooked, regardless of shape and size. The temperature of the potatoes is about 95° C. at their center and about 85° C. near their surface; the temperature of the potatoes is higher than that of the surrounding liquid medium because of the greater resistance of the potatoes to the flow of the electric current. The difference in temperature between center and surface regions of the potatoes is due to heat loss to the surrounding medium; however, the effect of this difference on the uniformity of the product is largely compensated by an initially more intensive heating of the surface region of the potato, which has a resistance exceeding that of the center region of the potato by about 33⅓% at room temperature. Greater uniformity in the temperature of the surface and center region of the potato can be accomplished by pre-heating the potato, e. g., in the course of steam-peeling it, to a temperature substantially above room temperature, for instance 73° C. Enzymatic tests show that in the treated potatoes there is a complete loss of tyrosinase activity and a partial loss of peroxidase activity. Discoloration of the treated potatoes is inhibited, as shown by colorimetric tests. The flavor of the treated potatoes is that of ordinary cooked potatoes. The potatoes are now ready for further processing, such as dicing, drying, comminution, and dehydration.

A corresponding treatment of unpeeled potatoes does not produce favorable results. The current does not flow through the interior of the potatoes due to the extremely high resistance of the skin; consequently, when the temperature of the liquid medium 18 rises from room temperature to 80° C., the temperature at the center of the unpeeled potatoes rises to only 58° C., the latter rise presumably being due substantially exclusively to heat transfer from the liquid medium to the potato. No substantial loss of enzymatic activity or reduction in the speed and intensity of discoloration of the treated unpeeled potato takes place.

The resistance to current flow of a peeled potato of 3 inches thickness and that of an unpeeled potato of the same thickness compare as follows. The resistance of the peeled potato is 10,000 ohms, while the resistance of the unpeeled potato is over 1,000,000 ohms. Resistance of a cooked peeled potato after subjection to conductive electronic heating in accordance with the present invention is only a small fraction of that of the uncooked peeled potato; the cooked potato has only about 5½% of the resistance of a corresponding peeled uncooked potato, when the measurement is made at 30° C.; at 90° C., the resistance of the cooked potato is only about one half of its resistance at 30° C., or about 2¾% of the resistance of an uncooked peeled potato (the latter being measured at 20° C.).

Best results are reached when the concentration of the liquid electrolyte is such that its resistance is intermediate that of the cooked and uncooked potatoes: In the example described above, a resistance between 500 and 600 ohms of the electrolyte was found to be particularly advantageous.

The time of treatment varies in accordance with the rate of current flow, prevailing room temperature, and other variable conditions. However, the current should be permitted to flow until the center of the potatoes has reached a temperature of 90° C. or higher, such as 92½° C. or 95° C.; at these temperatures a uniform cooking of the potato is accomplished. The time of electronic treatment can be reduced by pre-heating of the potatoes, for instance, by heating the potatoes to about 60° C. in a 65 to 70° C. pre-heating bath. The operations of peeling and pre-heating can be combined into a single operation by steam-peeling the potatoes and maintaining the steam-peeled potatoes at an elevated temperature for several minutes prior to their subjection to the electronic treatment. Pre-heating of the liquid electrolyte is also within the scope of the present invention. Successive batches of potatoes can be treated in the same liquid electrolyte which remains in the tank after the previous batch of potatoes has been removed. The heated liquid electrolyte may also serve as a pre-heating bath subsequent to the washing but prior to the peeling of the potatoes; immersion and removal of the potatoes may be accomplished by conventional means, e. g., by a net (not shown in the drawings).

It will be noted that conductive treatment of potatoes by placing them in high-frequency alternating circuit and permitting the current to flow through the body of the potatoes differs in kind from capacitive heating of potatoes in an electrostatic field. In capacitive heating, as distinguished from the conductive treatment of the present process, the potatoes are placed between the condenser plates of a high-frequency generator; it was observed that this type of heating produces non-uniform results due to the shape, irregularities of the potatoes, and results in the scorching of the potatoes by frequent sparks. On the other hand, conductive treatment of the potatoes in accordance with the present invention not only precludes damage to the potatoes caused by sparking, but results in a completely uniform end product, regardless of size and shape of the potatoes; uniformity of the final product is of great importance, as an incompletely treated portion of the potato will still be subject to enzymatic discoloration.

While the foregoing description and drawings set forth specific instances of the application of high frequency alternating current potatoes placed in the circuit itself, and illustrate a particular arrangement of an apparatus for carrying out the treatment, it will be understood that such specific instances and arrangements, including the voltage in the primary and secondary circuits, or number of cycles of the high-frequency alternating current may be changed without departing from the spirit of the invention. Numerous other variations and modifications will readily suggest themselves for the attainment of the object of the present invention, all falling within the scope and spirit thereof. It is therefore intended to claim the invention broadly, and to limit its scope not by any specific conditions and arrangements set forth in the description and drawings, but only by the appended claims.

I claim:

1. A process for the prevention of enzymatic potato discoloration, comprising immersing a peeled potato in an electrically conductive liquid having a resistance to an electric current below the resistance of an uncooked peeled potato and above the resistance of a cooked peeled potato to electric current, and passing a high-frequency alternating electric current through said liquid and through said potato, until said potato is cooked.

2. A process for the prevention of enzymatic potato discoloration, comprising immersing a peeled potato in an electrically conductive liquid having a resistance to an electric current below the resistance of an uncooked peeled potato and above the resistance of a cooked peeled potato to electric current, and passing a high-frequency alternating electric current through said liquid and through said potato until the temperature of the center region of said potato is raised to at least 90° C.

3. A process for the prevention of enzymatic potato discoloration comprising passing a high frequency alternating electric current through a water solution of an electrolyte, said solution having a resistance between about 500 ohms and about 600 ohms, and through a peeled potato immersed in said solution until the temperature of the center region of said potato is raised to at least 90° C.

4. A process for the prevention of enzymatic potato discoloration, comprising non-electrically preheating a potato to a temperature in the order of at least 60° C. but insufficient to cook said potato, and then passing high frequency alternating current through said potato in the peeled state and while immersed in an electrically conductive liquid having a resistance to an electric current below the resistance of an uncooked peeled potato and above the resistance of a cooked peeled potato, until said potato is cooked.

5. A process for the prevention of enzymatic potato discoloration, comprising non-electrically preheating a potato to a temperature in the order of at least 60° C. but insufficient to cook said potato, and then passing high frequency alternating current through said potato in the peeled state and while immersed in an electrically conductive liquid having a resistance between about 500 ohms and about 600 ohms, until said potato is cooked.

ARTHUR L. SCHADE.

REFERENCES CITED

The following references are of record in the file of this patent:

UNITED STATES PATENTS

| Number | Name | Date |
|---|---|---|
| 267,685 | Fowler | Nov. 21, 1882 |
| 1,035,777 | Bullock | Aug. 13, 1912 |
| 1,057,567 | Mauldin | Apr. 1, 1913 |
| 1,102,769 | Lincoln | July 7, 1914 |
| 1,189,725 | Northrup | July 4, 1916 |
| 1,404,549 | Schweizer | Jan. 24, 1922 |
| 1,522,188 | Hull | Jan. 6, 1925 |
| 1,754,574 | Sater | Apr. 15, 1930 |
| 1,900,573 | McArthur | Mar. 7, 1933 |
| 1,930,169 | Halvorson et al. | Oct. 10, 1933 |
| 1,934,703 | Golden | Nov. 14, 1933 |
| 1,992,515 | Uhlmann | Feb. 26, 1935 |
| 2,113,714 | Stein | Apr. 12, 1938 |
| 2,219,772 | Gernhardt | Oct. 29, 1940 |
| 2,299,088 | Griffith | Oct. 20, 1942 |
| 2,325,652 | Bierwirth | Aug. 3, 1943 |
| 2,405,984 | Sharpe | Aug. 20, 1946 |
| 2,474,650 | Birdseye | June 28, 1949 |

FOREIGN PATENTS

| Number | Country | Date |
|---|---|---|
| 23,893 of 1900 | Great Britain | May 11, 1901 |
| 509,293 | Great Britain | July 13, 1939 |
| 599,690 | France | Oct. 23, 1925 |
| 848,801 | France | July 31, 1939 |